L. F. BULLÔT.
APPARATUS FOR PRESERVATION OF MEAT AND OTHER ALIMENTARY SUBSTANCES.
APPLICATION FILED SEPT. 28, 1918.

1,320,988.

Patented Nov. 4, 1919.
3 SHEETS—SHEET 1.

L. F. BULLÔT.
APPARATUS FOR PRESERVATION OF MEAT AND OTHER ALIMENTARY SUBSTANCES.
APPLICATION FILED SEPT. 28, 1918.

1,320,988.

Patented Nov. 4, 1919.

L. F. BULLÔT.
APPARATUS FOR PRESERVATION OF MEAT AND OTHER ALIMENTARY SUBSTANCES.
APPLICATION FILED SEPT. 28, 1918.
1,320,988.
Patented Nov. 4, 1919.
3 SHEETS—SHEET 3.
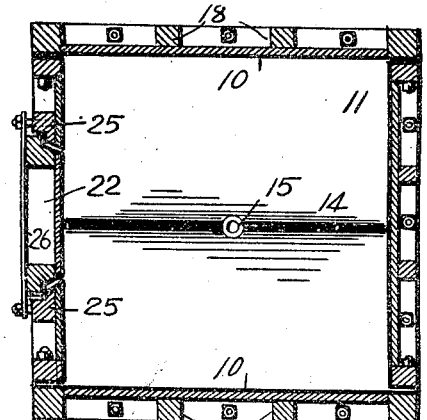
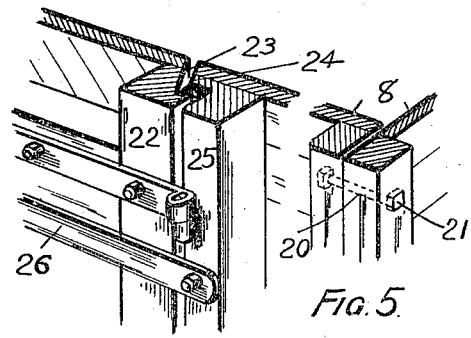
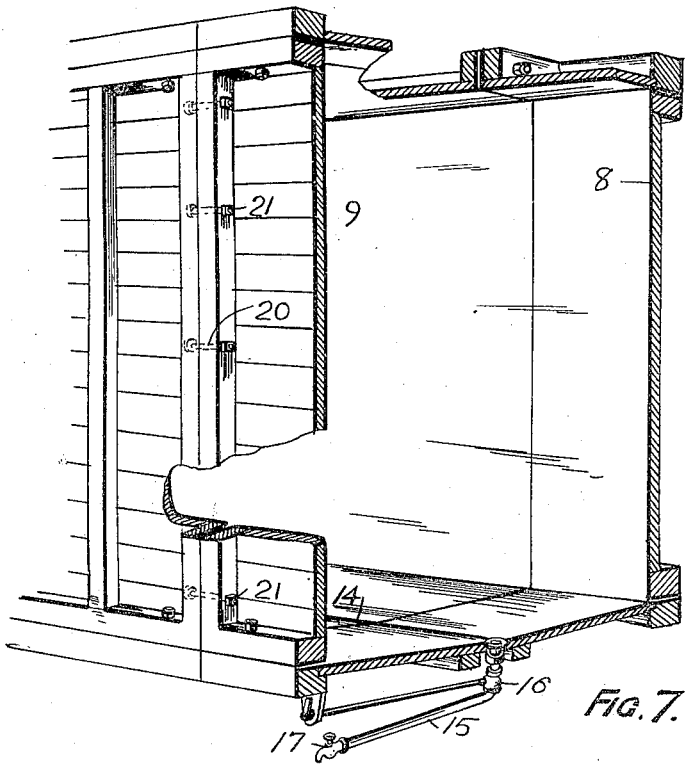

UNITED STATES PATENT OFFICE.

LOUIS FREDERICK BULLÔT, OF SYDNEY, NEW SOUTH WALES, AUSTRALIA.

APPARATUS FOR PRESERVATION OF MEAT AND OTHER ALIMENTARY SUBSTANCES.

1,320,988.  Specification of Letters Patent.  Patented Nov. 4, 1919.

Application filed February 28, 1918. Serial No. 219,679.

*To all whom it may concern:*

Be it known that I, LOUIS FREDERICK BULLÔT, a subject of the King of Great Britain, residing at Sydney, in the State of New South Wales, Commonwealth of Australia, have invented certain new and useful Improvements in Apparatus for Preservation of Meat and other Alimentary Substances, of which the following is a specification.

This invention relates to improvements in the preservation of meat and other alimentary substances which are subject to the action of putrefactive bacteria and in apparatus whereby the process may be carried into effect.

The invention is a development of the invention described in my prior Patent No. 1,119,398 of December 1, 1914, in which the alimentary substances are subjected to fumigation in a closed vessel, and in the apparatus whereby an installation or plant can be readily constructed and when necessary to treat a greater quantity of the substances.

According to the invention the fumigating mixture or charge is placed in a separate vessel or combustion chamber and fumes are generated therefrom on the external application of heat from a suitable burner situated below the chamber thereby avoiding an undue increase of temperature in the treatment chamber. This combustion chamber communicates by a pipe, controlled by a valve, with the treatment chamber into which the fumes pass and circulate around the substances to be treated. The treatment chamber is provided with an outlet or outlets at or adjacent to the top for the initial circulation of air which outlets are closed immediately any fumes pass therethrough. At or about the bottom of the treatment chamber a pipe leads therefrom to the floor level of the combustion chamber for the purpose of supplying air to the burning mixture so long as any free oxygen remains in the treatment chamber. After combustion of the fumigating mixture which is usually completed in about twenty minutes the meat or other substances are retained under the influence of the fumes for from 4 to 24 hours according to the particular kind of alimentary substance and its thickness. More oxygen for combustion may be required than is contained within the treatment chamber in which event I provide a cylinder of air or oxygen under pressure and connect it by a valve controlled pipe with the combustion chamber in order to supply the necessary oxygen.

The treatment chamber is made rectangular and is capable of ready extension. The walls, floor and roof are preferably composed of wood strengthened by studs or uprights and plates or horizontals with a sheet metal lining. The adjacent edges of the metal sheets are jointed with red lead or other composition and held between the studs and plates and secured by bolts and nuts. When it is desired to extend a treatment chamber the studs and plates at one end are disconnected and that end wall removed in order that additional side walls, roofing and flooring and the necessary extra studs and plates may be interposed and the end wall replaced. Additional sheet metal lining is provided being made airtight by jointing and secured between studs and plates as before. Preferably the added section or sections are made uniform so that one or more may be inserted according to the predetermined quantity of substances to be treated and it may be necessary to employ one or more combustion chambers to meet the increased capacity of the treatment chamber.

The ceiling and floor of the chamber is preferably made with a slight pitch to carry off any water of condensation which is trapped and run off as required.

A pressure gage may be provided on the treatment chamber which is fitted with an air tight door or doors and suitable peep holes.

Referring to the drawings herewith which illustrate the preferred construction of chamber—

Figure 1 is a perspective view of a complete plant for carrying out the process, while.

Figs. 5 and 6 are details of construction, and,

Figure 1:
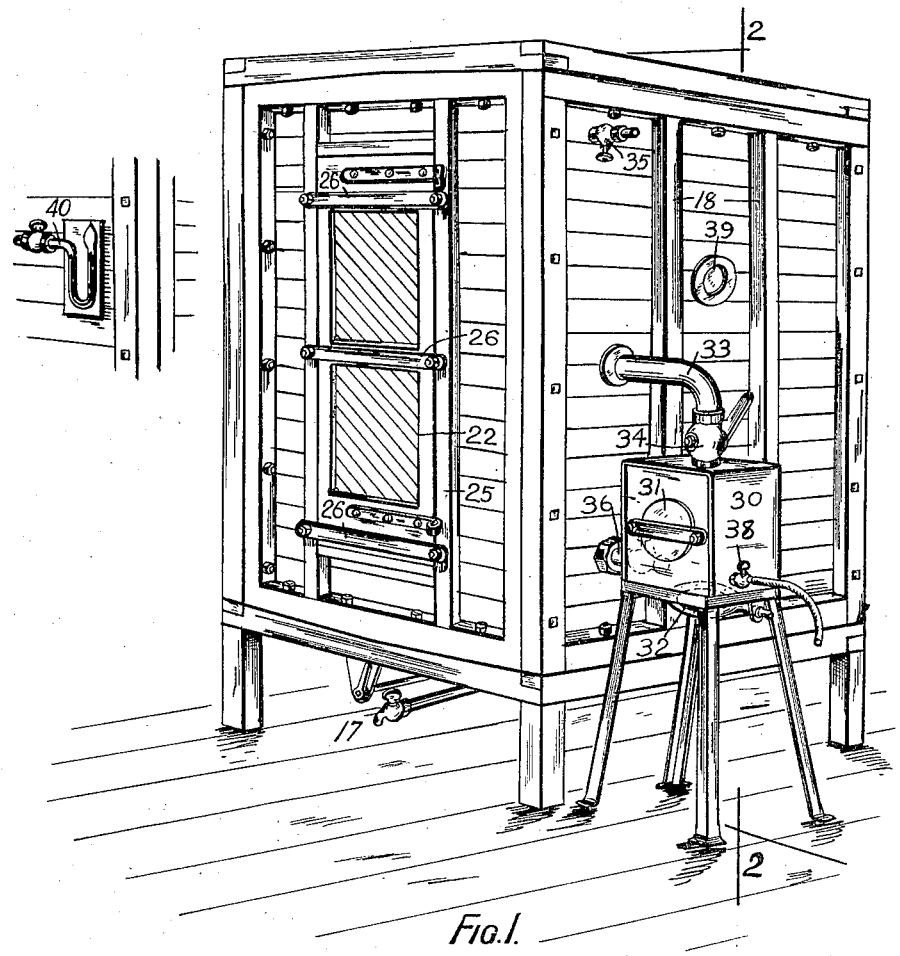
Figure 3:
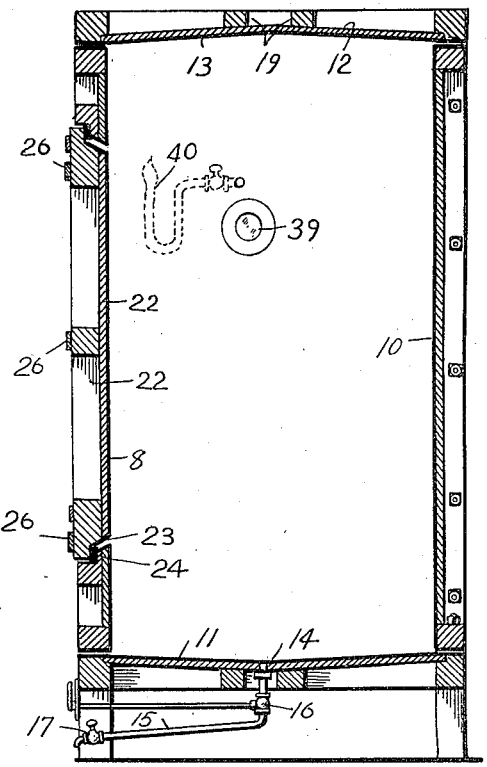
Figure 2:
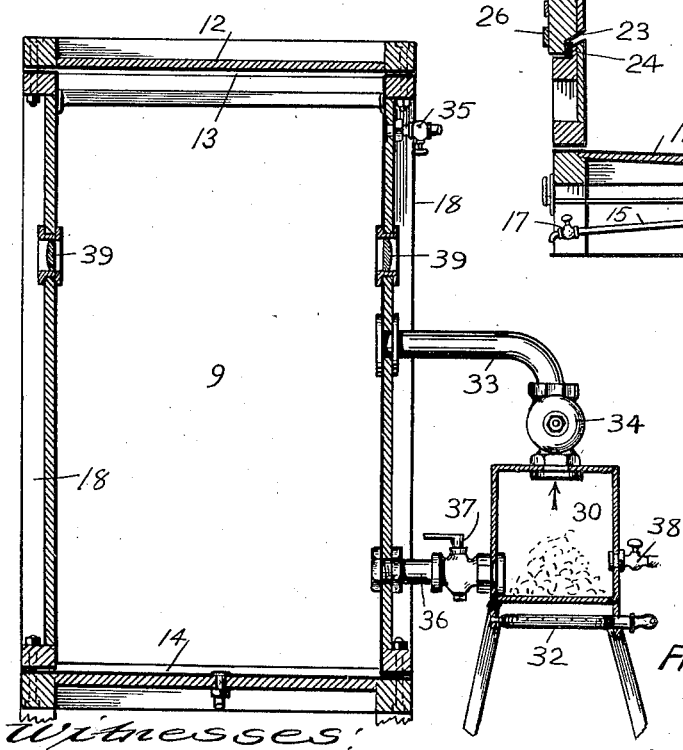
Fig. 2 is a sectional elevation on the plane 2—2, Fig. 1, and, Fig. 3 is a longitudinal section of the treatment chamber, and, Fig. 4 a sectional plan.

Fig. 7 a perspective view partly broken away illustrating the means for extending a treatment chamber.

The same reference numerals indicate the same or like parts.

The treatment chamber 9 is formed by walls 10, floor 11 and roof 12. The floor 11 and ceiling 13 are preferably slightly pitched the former having a channel 14 into which any water of condensation passes thence into a pipe 15, or trap, provided with cocks 16 and 17 spaced apart so that when the water is run off there will be a minimum loss of the fumes.

The walls are preferably strengthened by studs or uprights 18 and the whole chamber lined with sheet metal 8. The adjacent edges of the sheet metal are jointed with red lead or other suitable composition, and held between the studs 18 or plates 19 and secured by bolts 20 and nuts 21 as shown at Fig. 5. The door 22 is preferably hinged and has the inclined faces 23 which take against correspondingly inclined surfaces 24 on the door frame 25. The door preferably has securing bars 26 which may be locked to prevent unauthorized opening of the chamber during treatment of substances.

External of the treatment chamber 9 is the combustion chamber 30 formed of metal into which the fumigating mixture is placed through a door 31 and below the chamber 30 is a heating burner 32 whereby the mixture is heated externally thereby avoiding an undue increase of temperature in the treatment chamber 9. The chamber 30 is adapted to be made airtight and communicates by a pipe 33 controlled by a hand operated valve 34 with the treatment chamber 9 into which the fumes generated pass and circulate around the substances. The chamber 9 has one or more outlets 35 leading to the atmosphere in order to facilitate the initial circulation of air which outlet or outlets is or are closed immediately any fumes pass therethrough. Toward the bottom of the chamber 9 a pipe 36 leads therefrom to the floor level of the chamber 30 said pipe being controlled by a cock 37 and is for the purpose of supplying air to the chamber 30 so long as any free oxygen remains in the chamber 9. If further air or oxygen is required for combustion it is supplied to the chamber 30 through the valve controlled pipe 38 connected to a source of air or oxygen under pressure. 39 represents peep holes and 40 a pressure gage visible external of the chamber 9.

When it is desired to extend the capacity of chamber 9 the studs 18 and plates 19 at one end are disconnected and that end wall removed in order to permit additional side walls, roofing and flooring and the necessary additional studs and plates to be interposed and the end wall replaced making the treatment chamber thus enlarged airtight. If necessary one or more additional combustion chambers 30 may be employed to provide for the increased capacity of the treatment chamber.

In carrying out the treatment the alimentary substances which are preferably covered with stockinette or like fabrics, are suspended within the chamber 9 and the door closed so as to be airtight. The fumigating mixture is then placed within the combustion chamber 30 and the cocks 34 and 37 being opened the burner 32 is ignited. The mixture which is preferably composed of vegetable charcoal 8 parts, golden wattle bark 4 parts, saltpeter 2 parts and sulfur 4 parts together with a small proportion of oil of eucalyptus and oil of cinnamon, quickly gives off fumes which pass into chamber 9, the air therein passing out through the outlets 35 and being drawn through pipe 36 into the chamber 30. When fumes begin to appear through the outlets 35 they are closed.

When the generation of the fumes has ceased the cocks 34 and 37 may be closed and the substances allowed to remain under the influence of the fumes from 4 to 24 hours according to their nature and thickness. A pressure gage 40 may be employed to indicate the pressure in the chamber but in practice I find that if on viewing through the peep holes it is evident that the density of the fumes is sufficient to obscure the substances within the chamber the pressure is then ample.

I claim:—

1. In an apparatus of the class specified, a rectangular treatment chamber comprising a floor, walls and a roof, the floor and ceiling of the roof being reversely pitched and the chamber provided with a sheet metal lining, and an external combustion chamber for generation of fumes and having a valved pipe connected to the top thereof and to an intermediate part of the treatment chamber, a second valved pipe being also connected to the combustion chamber on a level with the floor of the latter and to the lower portion of the treatment chamber.

2. In an apparatus of the class specified, a rectangular treatment chamber comprising a floor, walls and a roof, the floor and ceiling of the roof being reversely pitched and the chamber provided with a metal lining, a valved air outlet pipe connected to the top portion of the chamber, opposite walls of the chamber having peep holes with transparent closures, a lower valved drain pipe connected to the center of the pitched floor, a pressure gage also connected to the chamber, and an externally located fume generating combustion chamber having a valved pipe connected to the top thereof and to an intermediate part of said treatment chamber, a valved return pipe also being connected to the combustion chamber on a level with the floor of the latter and to the lower portion of the treatment chamber.

In testimony whereof I have hereunto set my hand in presence of two subscribing witnesses.

LOUIS FREDERICK BULLÔT.

Witnesses:
CHARLES E. GRAHAM,
HENRY W. CLARKE.